April 21, 1970     L. H. PATCHEN     3,507,208
APPARATUS FOR FERMENTING WINE
Filed Aug. 26, 1968     2 Sheets-Sheet 2
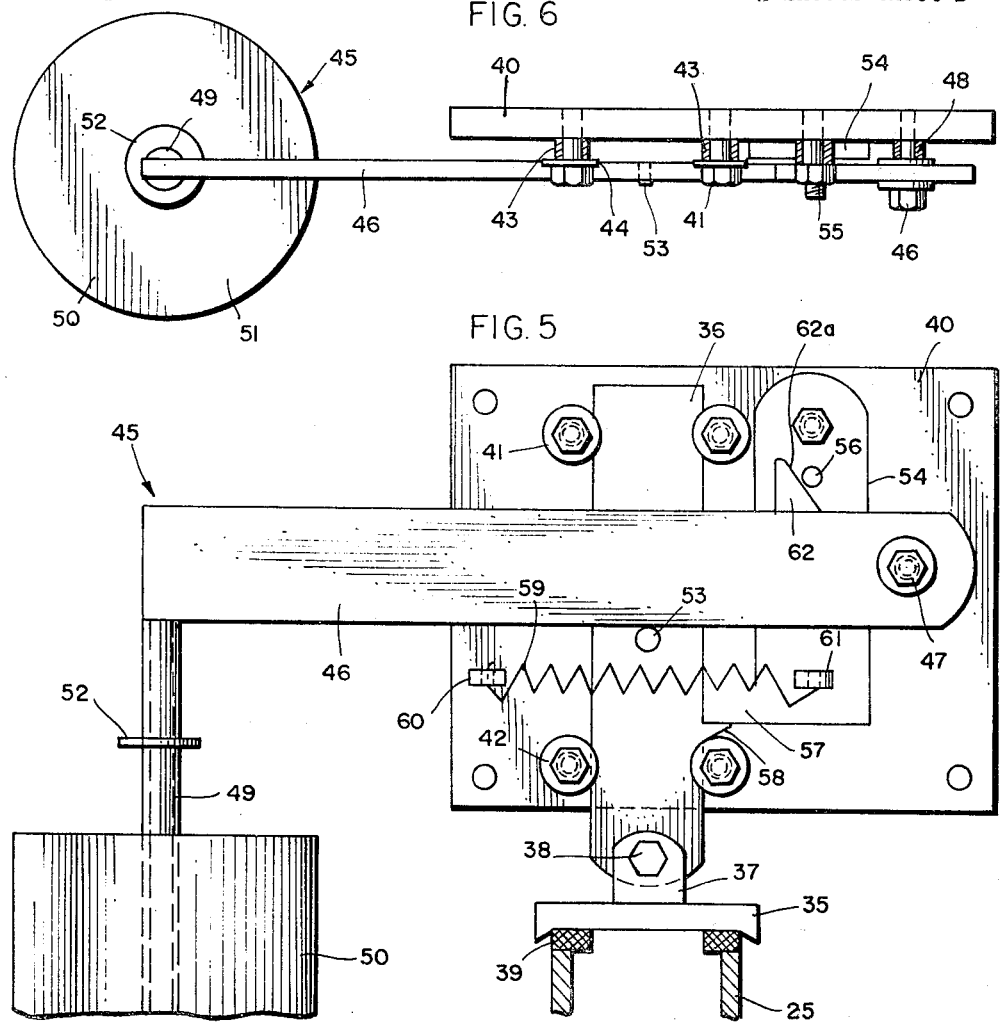
INVENTOR:
LEE H. PATCHEN
BY
Dawson, Tilton, Falloy & Lungmus
ATT'YS United States Patent Office 3,507,208
Patented Apr. 21, 1970

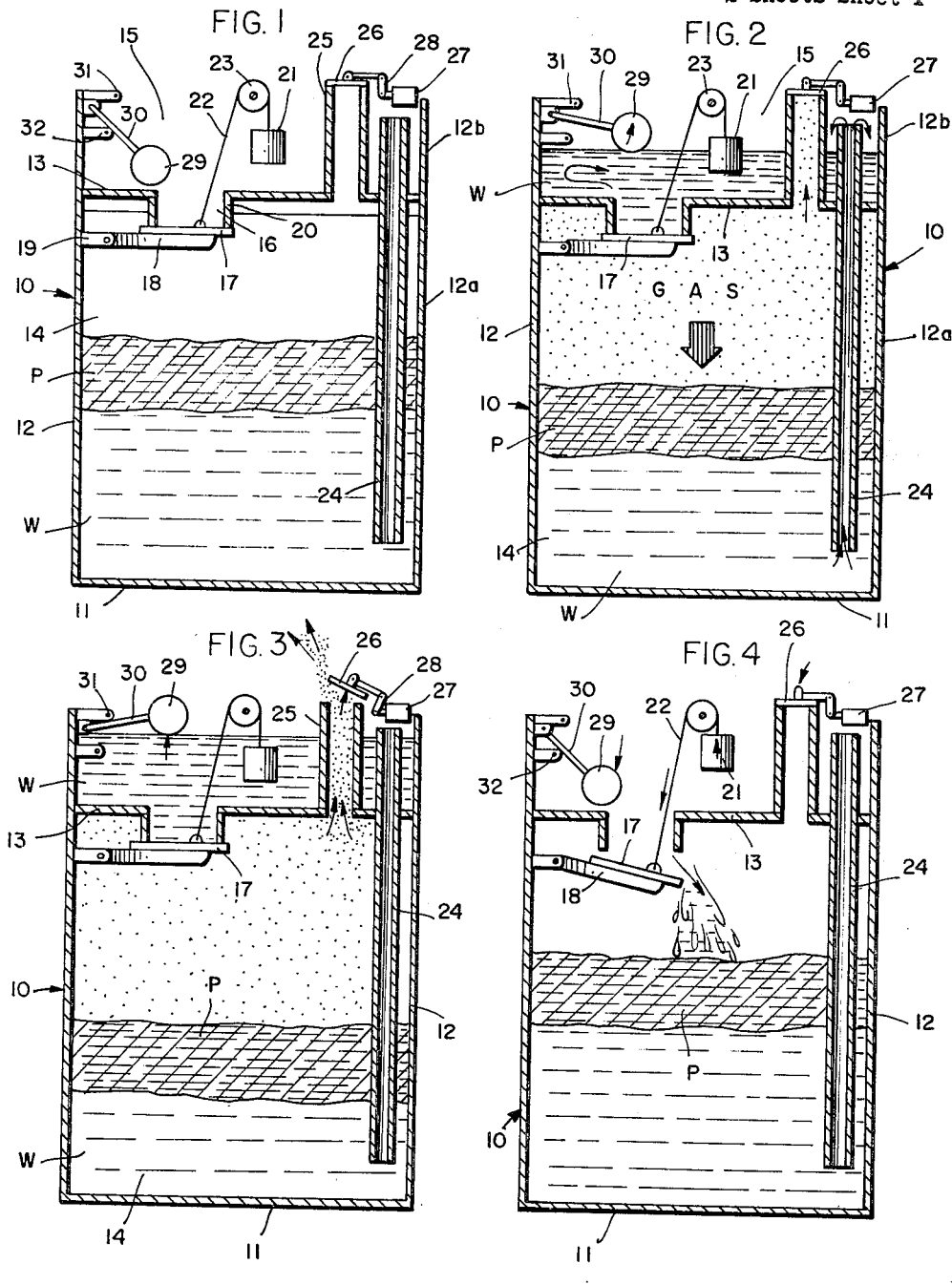

3,507,208
APPARATUS FOR FERMENTING WINE
Lee H. Patchen, Knoxville, Ark., assignor to A. J.
Industries, Inc., a corporation of Delaware
Filed Aug. 26, 1968, Ser. No. 755,028
Int. Cl. C12c 7/00
U.S. Cl. 99—276
13 Claims

ABSTRACT OF THE DISCLOSURE

An apparatus for fermenting wine in which the wine is automatically circulated through the pomace. The apparatus includes a lower chamber for holding the wine and pomace and an upper chamber, the two chambers being separated by a normally-closed dump valve. In addition, the lower chamber is provided with a normally-closed exhaust valve. A conduit extends from below the wine level in the lower chamber into the upper chamber, and as the wine in the lower chamber ferments, the increase in pressure resulting from the generation of carbon dioxide gas forces the wine through the conduit into the upper chamber. When the wine reaches a predetermined level, the exhaust valve is automatically opened and the fermentation gases in the lower chamber are allowed to escape. The weight of the wine in the upper chamber causes the dump valve to open, permitting the wine to return to the lower chamber and filter through the floating pomace. The exhaust valve is then closed and the dump valve is returned to its original position to begin a new cycle.

BACKGROUND

Most of the desirable color of wine is obtained from nutrients contained in the skin or pomace of the crushed grape. However, since the pomace is lighter than the wine and floats on top of the juice in the fermenting tanks, the wine must be flushed through the pomace to obtain the desired color.

In the past, the wine was generally pumped manually from the fermenting tank to a second tank and then pumped back to the top of the fermenting tank and allowed to pass over the skins. However, because of the labor involved, this pumping process can be performed only a few times in a fermentation cycle. Automatic pumps have proved to be unsatisfactory for this purpose because the skin, vine stems, and other residue tend to plug up the pumps and relatively small piping.

SUMMARY

Applicant's invention permits the wine to be automatically and continually passed through the pomace without the use of pumps. The invention utilizes the carbon dioxide gas which is given off during fermentation to force the wine from the fermenting tank upwardly to a second chamber above the fermenting tank. The second chamber may communicate with the fermenting chamber by a dump valve, and the dump valve is normally maintained closed by the pressure exerted by the gas within the fermenting chamber. When a predetermined amount of wine is pumped up to the second chamber, the gas in the fermenting chamber is vented to the atmosphere, and the weight of the wine in the second chamber forces the dump valve open, allowing the wine to fall into the fermenting chamber and pass through the pomace. The exhaust valve and the dump valve are then automatically closed, and the cycle begins again.

DESCRIPTION OF THE DRAWING

FIG. 1 is an elevational sectional view of the apparatus embodying the invention;

FIG. 2 is a view similar to FIG. 1 illustrating carbon dioxide gas forcing wine into the upper chamber;

FIG. 3 is a view similar to FIGS. 1 and 2 illustrating the exhaust valve being opened to release the gas; and FIG. 4 is a view similar to the other views illustrating the wine returning to the fermenting chamber and passing through the pomace;

FIG. 5 is a fragmentary elevational view of a modified form of apparatus; and

FIG. 6 is a top plan view of FIG. 5.

DESCRIPTION OF SPECIFIC EMBODIMENT

Referring to the drawing, the numeral 10 designated generally a wine-fermenting tank having a bottom 11 and a cylindrical side wall 12. A top wall 13 extends between the side wall 12 and partitions the tank 10 into a lower chamber 14 and an upper chamber 15, the lower chamber being defined by the bottom wall 11, top wall 13, and the portion 12a of the side wall 12 which is between the walls 11 and 13, while the upper chamber 15 is defined by the wall 13 and the portion 12b of the side wall 12 which extends above the wall 13.

The wall 13 between the upper and lower chambers is provided with an opening 16 which is normally closed by dump valve or return valve 17. The dump valve may be a circular plate and is supported by a lever arm 18 rotatably secured to arm 19 extending from the tank wall. If desired, a downwardly extending perimetric sleeve 20 may be provided about the opening 16 to engage the dump valve 17. The dump valve is urged against the sleeve 20 to close the opening 16 by weight 21 which is connected to the valve by cable 22. The cable passes over pulley 23 which may be rotatably mounted on the tank. It is to be understood, however, that other means may be used to close the valve, such as springs and the like.

A flow tube or conduit 24 extends from adjacent the bottom of the lower chamber 14 upwardly through the wall 13 and opens into the upper chamber 15. I have found that a three inch diameter tube is advantageously used for the flow tube 24 to minimize the possibility that the tube may become clogged by pomace, stems, or other residue.

An exhaust pipe 25 communicates with the chamber 14 through the wall 13 and is normally closed by exhaust valve 26. The exhaust valve is connected to an electric solenoid 27 by bell crank 28 pivotally mounted on the tank 10.

A ball float 29 is carried by support arm 30 which is rotatably mounted on the tank 10, and the arm 30 is swingable between a first electric switch 31 and a second electric switch 32, both of which are operatively connected to solenoid 27. Each of the switches 31 and 32 are preferably of the type that remain in one position, either open or closed, until the position of the other switch is changed, and several suitable switches are available, for example a toggle switch.

In operation, the crushed grapes and juice are poured or pumped into the lower chamber 14. Referring to FIG. 1, the skins or pomace P are lighter than the liquid wine W and float on the top thereof. The dump valve 17 is maintained in the closed position illustrated by the weight 21, and the exhaust valve 26 is maintained in the closed position by the solenoid 27, thereby sealing the upper portion of the lower chamber.

As the wine ferments, carbon dioxide gas is given off which collects in the first chamber above the pomace and wine. As the pressure of the gas increases, the wine W is forced upwardly through the pipe 24 and overflows at the top of the pipe into the second chamber 15 (FIG. 2). The lower end of the pipe 24 is preferably positioned adjacent the bottom 11 of the lower chamber so that the level of the wine in the lower chamber will not fall below the lower end of the pipe.

As the wine continues to pour into the upper chamber 15, the downward force exerted on the dump valve 17 by the weight of the wine in the upper chamber increases. However, this downward force is offset by the upward force exerted by the gas pressure, and the dump valve remains closed. As the level of the wine rises in the second chamber, the ball float 29 moves upwardly, and its supporting arm 30 approaches the first switch 31. Preferably, the upper end of the pipe 24 is positioned above the maximum level which the wine reaches before the first switch 31 is closed so that the liquid flows over the upper end of the pipe as illustrated in FIG. 2.

After the wine in the upper chamber rises to a certain level, for example two feet, the support arm 30 will close the switch 31, thereby activating the solenoid 27 to rotate the bell crank 28 and open the exhaust valve 26 (FIG. 3). The gas which was trapped in the lower chamber is vented to the atmosphere, and the upward pressure exerted on the dump valve 17 is reduced. The downward force on the dump valve exerted by the weight of the wine then causes the dump valve to pivot downwardly, and the wine in the upper chamber flows into the lower chamber, washing the pomace P and withdrawing coloring nutrients (FIG. 4). When all of the liquid has flowed out of the upper chamber, the ball float reaches its bottom position and its supporting arm 30 contacts the second switch 32, causing the solenoid 27 to close the exhaust valve 26. The dump valve 17 is closed by the counterweight 21, which need be only slightly heavier than the dump valve and its support arm.

The space above the wine in the lower chamber is again sealed, and the apparatus may begin another cycle. During the height of fermentation, carbon dioxide gas is given off at a rate which will produce a cycle approximately every 15 minutes.

Although I have described the dumping operation as being begun by the switch 31 which causes the exhaust valve 26 to open, it is to be understood that modifications can be envisioned. For example, the ball float mechanism may be used to open the dump valve 17, thereby allowing the carbon dioxide gas to pass out of the lower chamber while the wine in the upper chamber flows downwardly. Alternatively, the ball float mechanism could be eliminated, and the weight of the counterweight 21 could be varied to allow the dump valve 17 to open after a desired amount of wine is collected in the upper chamber.

Modified switch means for opening the exhaust valve of the lower chamber is illustrated in FIGS. 5 and 6. The exhaust pipe 25 of the wine-fermenting tank 10 is closed by an exhaust valve 35 carried by an elongated generally vertically extending bar 36. A connecting flange 37 extends upwardly from the valve 35 and is secured to the bar 36 by bolt or rivet 38. If desired, a sealing gasket 39 may be positioned on the upper end of the exhaust pipe 25.

The bar 36 is slidably secured to a mounting plate 40 supported by the tank 10 adjacent the upper chamber. The bar 36 is positioned between upper and lower pairs 41 and 42, respectively, of bolts, and each bolt carries a cylindrical spacer 43 having an axial length approximately equal to the thickness of the bar 36. Each of the bolts includes a radially outwardly extending flange 44, and the bar 36 may slide longitudinally between the flanges 44 of the bolts and the surface of the mounting plate 40.

Float assembly 45 normally maintains the bar 36 in the position illustrated in FIG. 5 in which the valve 35 seals the exhaust pipe 25 by the float assembly 45. The float assembly 45 includes a cantilever support arm 46 which is rotatably secured to the mounting plate 40 by bolt 47 and which is spaced outwardly from the bar 36 by spacer 48. A generally vertically extending rod 49 is secured to the outer end of the cantilever arm 46, and the rod 49 supports a hollow, cylindrical float 50. The float is positioned within the upper chamber and may slide axially upwardly along the rod 49 until the upper end 51 of the float engages the washer 52 secured to the rod. A suitable stop means is also carried by the lower end of the rod to prevent the float from sliding off of the rod.

The weight of the float assembly 45 causes the cantilever arm 46 to bear downwardly against stud 53 which extends outwardly from the bar 36. A pawl 54 is rotatably attached to the mounting plate 40 by bolt 55 and includes an outwardly extending stud 56 and a tooth projection 57 which is engageable with a tooth projection 58 on the bar 36. A spring 59 is attached to the mounting plate 40 and the pawl 54 by means of flanges 60 and 61, respectively, and biases the tooth 57 of the pawl toward the bar 36. The upper edge of the arm 46 includes an upwardly extending finger 62 having an inclined side 62a.

In operation, as the wine is forced from the lower chamber to the upper chamber, the float 50 rises and slides axially along the rod 49. As the wine continues to pour into the upper chamber, the float 50 eventually engages the washer 52 and causes the cantilever arm 46 to pivot upwardly about its pivot connection 47. As the arm 46 pivots upwardly, the finger 62 rotates clockwise as viewed in FIG. 5 and engages the stud 56, thereby causing the pawl 54 and the tooth projection 57 thereon to pivot counterclockwise away from the bar 36. As the cantilever arm 46 continues to rotate, the tooth 57 is eventually disengaged from the tooth 58 on the bar 36, and the pressure of the fermentation gas within the lower chamber pushes the valve 35 and bar 36 upwardly.

As the fermentation gas escapes past the open valve 35, the upward pressure exerted on the dump valve between the upper and lower chambers is reduced, and the downward force on the dump valve exerted by the weight of the wine causes the dump valve to open. The level of wine in the upper chamber falls, the float 50 moves downwardly, and the cantilever arm 46 rotates counterclockwise. The cantilever arm eventually engages the stud 53 on the arm 56 and urges the exhaust valve 35 toward the upper end of the exhaust pipe 25, but the weight of the cantilever arm 46, float rod 49, bar 36 and valve 35 is not enough to overcome the tension of spring 59 and push the tooth 58 downwardly past the tooth 57. The valve 35 is thereby maintained in an open position while the wine flows from the upper chamber. The float, which is of ample proportions so that it not only has a good lifting force when floating but also provides a substantial downward force on the cantilever arm when out of the liquid, slides downwardly along the rod 49 as the wine lever falls. When all of the wine has flowed into the lower chamber, the float engages the stop on the lower end of rod 49, and the weight of the float pushes the locking pawl 54 counterclockwise by virtue of the camming action between the mating inclined surfaces of the tooth projections 57 and 58. The rod 36 then moves downwardly to close the valve 35, and the spring 59 returns the pawl to the locking position illustrated in FIG. 5.

When all of the wine has returned to the lower chamber and the float and cantilever arm have returned to their original positions, the spring 59 causes the tooth 57 to return to its locking position with respect to the tooth 58 on the bar 36, thereby locking the valve 35 in the closed position. The dump valve is closed as hereinbefore described, and the apparatus may begin another cycle.

While in the foregoing specification, I have described detailed embodiments of my invention for the purpose of illustration, it is to be understood that many of the details herein given may be varied considerably by those skilled in the art without departing from the spirit and scope of my invention.

I claim:

1. In wine-fermenting apparatus, first chamber means for holding liquid wine and pomace, second chamber means above the first chamber means, return valve means between said first and second chamber means for permitting the first and second chamber means to communicate, said return valve means normally being closed, conduit means extending from the first chamber means to the second chamber means whereby gas produced by fermentation of the wine may force wine from the first chamber means through the conduit means to the second chamber means, said return valve means opening after a discrete time interval to return the wine from the second chamber to the first chamber.

2. The apparatus of claim 1 including exhaust valve means for venting the gas from the first chamber means, said return valve means operable by the weight of the wine in the second chamber means.

3. The apparatus of claim 2 including switch means operably associated with said exhaust valve means, said switch means sensing the level of wine in the second chamber means to open said exhaust valve when the wine reaches a predetermined level.

4. The apparatus of claim 2 including a float and a switch in the second chamber means, said exhaust valve means including an exhaust valve connected to a solenoid, said switch being operable by said float to activate said solenoid.

5. The apparatus of claim 2 including counterweight means associated with said reutrn valve means for closing the return valve means after the wine returns from the second chamber to the first chamber.

6. The apparatus of claim 1 including exhaust valve means for venting the gas from the first chamber means, said return valve means operable by the weight of the wine in the second chamber means, switch means mounted on said apparatus and including a float carrier by a support arm, said support arm permitting said exhaust valve means to open when said float reaches a predetermined level and causing said exhaust valve means to close when the wine returns to the first chamber.

7. In wine-fermenting apparatus, a tank providing an upper chamber and a lower chamber, a dump valve between the upper and lower chambers for permitting the chambers to communicate, said dump valve normally being closed, a flow pipe extending upwardly from the lower chamber to the upper chamber whereby gas produced by fermentation of the wine may force wine from the lower chamber through the pipe to the upper chamber, an exhaust valve in the lower chamber for venting the fermentation gas from the lower chamber, switch means for opening the exhaust valve when a predetermined amount of wine is contained in the upper chamber, said dump valve being maintained in a closed position by the pressure of the fermentation gas, the weight of the wine in the upper chamber causing the dump valve to open when the exhaust valve is opened.

8. The apparatus of claim 7 wherein said switch means includes a float and an electrical switch, said float activating the switch when the wine reaches a predetermined level in the upper chamber and when the wine has substantially completely flowed out of the upper chamber.

9. The apparatus of claim 8 including a solenoid operably connected to said valve and said switch, said solenoid opening the exhaust valve when the wine reaches a predetermined level in the upper chamber and closing the exhaust valve when the wine has substantially completely flowed out of the upper chamber.

10. The apparatus of claim 7 including a counterweight connected to the dump valve for closing the dump valve after the wine has substantially completely flowed out of the upper chamber.

11. The apparatus of claim 7 wherein said switch means includes a float carried by a support arm rotatably mounted on said tank, said float being supported in said upper chamber and being movable upwardly as the wine flows into the upper chamber, pawl means rotatably mounted on said tank and engageable with said support arm for movement therewith, said pawl means normally holding said exhaust valve closed and being rotatable by said support arm as said float rises to open said exhaust valve.

12. The apparatus of claim 11 in which said float is slidably carried by a generally vertically extending rod secured to said support arm, stop means on said rod for limiting upward sliding movement of the float with respect to the rod, whereby said float may rise a predetermined distance before said support arm begins to rotate.

13. The apparatus of claim 7 wherein said switch means includes a float carried by a support arm rotatably mounted on said tank, said float being supported in said upper chamber and being movable upwardly as the wine flows into the upper chamber, a generally vertically extending bar slidably supported on said tank and attached to said exhaust valve, and stud means on said bar engageable with said support arm whereby upward rotation of said support arm permits said exhaust valve to open and downward rotation of said support arm causes said exhaust valve to close.

References Cited

UNITED STATES PATENTS

| | | | |
|---|---|---|---|
| 1,487,842 | 3/1924 | Dolenz | 99—276 X |
| 2,536,994 | 1/1951 | Cremaschi | 99—35 |
| 2,811,448 | 10/1957 | Rietz | 99—36 |

ROBERT W. JENKINS, Primary Examiner